United States Patent
Aoki

[19]

[11] Patent Number: 6,136,481
[45] Date of Patent: Oct. 24, 2000

[54] COLOR FILTER MANUFACTURING METHOD CAPABLE OF ASSURING A HIGH ALIGNMENT ACCURACY OF COLOR FILTER AND ALIGNMENT MARK THEREFOR

[75] Inventor: Tetsuro Aoki, Fukuyama, Japan

[73] Assignee: Sharp Kabushiki Kaisha, Osaka, Japan

[21] Appl. No.: 09/234,853

[22] Filed: Jan. 22, 1999

[30] Foreign Application Priority Data

Jan. 26, 1998 [JP] Japan ................................. 10-012546

[51] Int. Cl.$^7$ .......................... G02B 5/20; G02F 1/1335
[52] U.S. Cl. .................................. 430/7; 430/22
[58] Field of Search ........................................... 430/7, 22

[56] References Cited

U.S. PATENT DOCUMENTS 5,935,741  8/1999  Kim et al. ..................................... 430/7

FOREIGN PATENT DOCUMENTS

| | | |
|---|---|---|
| 03163403 | 7/1991 | Japan . |
| 04133349 | 5/1992 | Japan . |
| 06260390 | 9/1994 | Japan . |
| 08297206 | 11/1996 | Japan . |
| 09096712 | 4/1997 | Japan . |

*Primary Examiner*—John A. McPherson
*Attorney, Agent, or Firm*—David G. Conlin; Peter J. Manus; Dike, Bronstein, Roberts & Cushman

[57] ABSTRACT

A red filter and a red alignment mark are simultaneously formed by performing alignment of a photomask for exposure with a groundwork alignment mark. When forming a blue filter, a blue filter pattern is formed from a blue resist by performing alignment of a photomask with the red alignment mark by using a red alignment light. Intensities of reflection lights concerning the red alignment mark are increased by using the red alignment mark that does not absorb the red alignment light when forming the blue filter, so that a high contrast of the red alignment mark is obtained.

6 Claims, 4 Drawing Sheets

COLOR FILTER MANUFACTURING METHOD CAPABLE OF ASSURING A HIGH ALIGNMENT ACCURACY OF COLOR FILTER AND ALIGNMENT MARK THEREFOR

BACKGROUND OF THE INVENTION

The present invention relates to method of manufacturing a color filter by means of a color resist and an alignment mark to be used for this color filter manufacturing method.

Nowadays, applications of the solid-state imaging devices including CCD (Charge Coupled Device) are spreading to digital still cameras and image input terminals for personal computers and so on in addition to video movies. Under these circumstances, there is a growing demand for the use of color filters of a primary color system in place of color filters of a complementary color system which have conventionally been in the mainstream. The color filters of the primary color system have been in the spotlight for their very simple signal processing performance and extensive applicability. However, the manufacturing method thereof has become difficult to be adopted due to an extremely large volume shift (a maximum of 1 μm in lateral direction) through a dying process in such a big microstructural progress of the solid-state imaging devices.

Color filters manufactured by the dying method which have conventionally been in the mainstream are required to achieve a rapid improvement for the reason that the resolution and uniformity are coming close to their limits and for the reason that the dying of the primary color system has a slight lack of process stability as compared with the dying of the complementary color system. Under such circumstances, fabrication of a color filter by means of the aforementioned color resist, which has reached to a certain level in terms of the dispersibility and processability of pigment, has come to attract latest attentions although some problems are currently left in terms of the resolution and so on. Expecting the future improvement in performance, the fabrication of the color filter by means of the color resist will produce a great effect not only on improvement in characteristics of the solid-state imaging devices but also on enhancement of manufacturing yield and a reduction in manufacturing cost. It is to be noted that the color resist is a positive or negative resist obtained by dispersing a pigment in a transparent base material, or a positive or negative resist obtained by uniformly dissolving a dye in a transparent base material.

According to the color filter manufacturing method using the color resist as described above, there is a problem in terms of alignment of a photomask used in exposing a color resist in a blue filter forming process as described in detail below. That is, in an exposure apparatus such as a stepper, an alignment mark on a substrate is normally detected by a red light of a He—Ne laser or the like in an alignment process. The red light is used for avoiding the activation of the resist. On the other hand, there is the fact that the blue color resist has a very low transmittance of the red light.

Normally, as shown in FIGS. 6A and 6B, the alignment of a photomask (not shown) for exposure in the blue filter forming process is executed by detecting an alignment mark (groundwork alignment mark) 2 formed on a substrate 1 by means of the red light through an overcoat film 3 that functions as a flattening film and through a blue resist layer 4. However, due to absorption of the red light by the blue resist layer 4 in addition to low contrast of the groundwork alignment mark 2, a signal light that is reflected on and diffracted by the groundwork alignment mark 2 and enters a detector (not shown) becomes very faint. Therefore, the alignment of the photomask in the blue filter forming process is very difficult to be executed. It is to be noted that the reference numeral 5 denotes a filter of another color (red, for example) and the reference numeral 6 denotes a blue filter.

In order to solve the aforementioned problem, there have been proposed various methods such as a method for improving the groundwork alignment mark detection performance by improving an alignment optical system as disclosed in the prior art references of Japanese Patent Laid-Open Publication No. HEI 6-260390 and Japanese Patent Laid-Open Publication No. HEI 4-133349, a method for removing the color resist on the groundwork alignment mark in a coating stage, as disclosed in the prior art references of Japanese Patent Laid-Open Publication No. HEI 3-163403 and Japanese Patent Laid-Open Publication No. HEI 8-297206 and so on. However, it is not possible for any of the above methods, each of which requires improvement of existing apparatus and introduction of new apparatus, to assure a high throughput at low cost. Therefore, a more simple method for solving the problems of the alignment in the blue filter forming process is demanded.

Lately, a color filter manufacturing method for improving illuminance of the alignment mark without requiring the improvement of the existing apparatus nor the introduction of the new apparatus as described above has been proposed (Japanese Patent Laid-Open Publication No. HEI 9-96712). According to this color filter manufacturing method, as shown in FIG. 7A, a flattening layer 13 is formed to cover the alignment mark 12 on a substrate 11 and a transparent layer 14 is formed on the flattening layer 13 in a position just above the alignment mark 12. Next, a color resist layer 15 is formed on the flattening layer 13 and the transparent layer 14 so that the thickness of the color resist layer 15 on the transparent layer 14 is thinner in a portion on the transparent layer 14 than in the other portions. Then, as shown in FIGS. 7A and 7B, a color filter 17 comprised of a pattern of the color resist layer 15 is obtained by detecting the alignment mark 12 by applying an alignment light 16, performing positional alignment of a photomask (not shown) with the substrate 11 and thereafter subjecting the color resist layer 15 to exposure to light and development. With this arrangement, by virtue of the thin film thickness of the color resist layer 15 just above the alignment mark 12, illuminance of the alignment mark 12 can be improved even when the color resist layer 15 is a blue resist layer and the alignment light 16 is a red light.

The color filter manufacturing method shown in FIGS. 7A and 7B basically follows the conventional method, in which for forming an alignment mark is just the same time of forming a layer (polysilicon electrode or a light-shielding layer, for example) for trimming the light-sensing aperture, in the field of solid-state imaging devices and the like, and the method is regarded as a measure for increasing the illuminance of the alignment mark without process improving cost and significant process change.

However, the above prior art color filter manufacturing method has the problems as follows. That is, as shown in FIG. 7A, the thick flattening layer 13 is formed between the color resist layer 15 that serves as a layer to be aligned and the alignment mark 12. When such a thick flattening layer 13 is formed between the layer to be aligned (the color resist layer 15) and the groundwork alignment mark (the alignment mark 12), a great distance is made between the top surface of the layer to be aligned and the top surface of the groundwork alignment mark. Therefore, particularly when a laser light is used as the alignment probing light, there is a problem that an alignment error tends to occur due to refraction or ghost.

Furthermore, there is a still remaining problem in regard to improvement in contrast of the alignment mark necessary for mark recognition of the exposure apparatus. That is, assuming that the alignment light 16 has a luminosity I, that the color resist 15 has an optical-absorption coefficient a, that the color resist 15 has a film thickness $d_1/2$ ($d_1$: film thickness of the flat portion of the color resist 15) just above the alignment mark 12, that the substrate 11 has a reflectance $R_0$ and that the alignment mark 12 has a reflectance $R_M$, then the contrast C of the alignment mark 12 is expressed by $C \approx Ie^{-\alpha d_1}|(R_0 - R_M)|$. Therefore, the contrast C of the alignment mark 12 depends on the reflectance $R_M$ of the alignment mark 12. However, as described above, the groundwork alignment mark is normally formed with a silicon compound layer that determines the light-receiving aperture of the polysilicon electrode, light-shielding layer or the like. Therefore, the reflectance $R_M$ is not so significantly different from the reflectance $R_0$ of the substrate 11 formed of silicon or silicon oxide, so that the contrast C of the alignment mark 12 becomes not so strong.

Furthermore, if the transparent layer 14 has a shape identical to the shape of the alignment mark 12 and they are vertically stacked, then a light that penetrates either the transparent layer 14 or the alignment mark 12 is mixed with a light that penetrates peripheral portions of both of them, possibly causing generation of a false signal of a mark signal of the exposure apparatus.

That is, according to the above prior art color filter manufacturing method, there are the remaining problems of the alignment error due to the great distance between the color resist layer 15 and the alignment mark 12, the reduction in contrast of the alignment mark 12, the generation of the false signal of the mark signal of the exposure apparatus and so on, and thereby a high alignment accuracy cannot be assured when the illuminance is reduced due to the absorption of the red alignment light by the blue resist.

SUMMARY OF THE INVENTION

Accordingly, the object of the present invention is to provide a color filter manufacturing method capable of obtaining a high contrast, assuring a high alignment accuracy, assuring a high throughput in a color filter forming process and suppressing a cost increase due to improvement of the prior art process.

In order to achieve the above-mentioned object, the present invention provides a color filter manufacturing method for forming a plurality of types of color filters from color resists by a photolithographic technique, comprising the steps of:

selecting a color resist of a specified color having a lowest transmittance with respect to light for alignment from among the color resists, and forming an alignment mark of a color different from the specified color of the selected color resist; and forming a color filter from the selected color resist by performing alignment of a photomask for exposure with the alignment mark.

According to the above invention, the alignment mark to be used in forming the color filter of the specified color having the lowest transmittance with respect to light for alignment is formed in a color other than the above specified color. Therefore, when forming the color filter of the specified color having the lowest light transmittance, the alignment mark of a color having a higher transmittance than that of the specified color is used, so that a contrast higher than when an alignment mark of the specified color or a transparent alignment mark is used can be obtained.

The present invention also provides a color filter manufacturing method for forming a plurality of types of color filters from color resists by a photolithographic technique, comprising the steps of:

forming an alignment mark of a color identical to a color of light of an alignment optical system; and forming a color filter from a color resist by performing alignment of a photomask for exposure with the alignment mark.

According to the above invention, when forming a color filter of a color different from the color of the light of the alignment optical system, the alignment of the photomask is performed with the alignment mark of the color identical to the color of the light of the alignment optical system. Therefore, when forming a blue color filter having the lowest transmittance of red light, for example, in the case where the light of the alignment optical system is red, the red alignment mark having the highest transmittance is to be used, so that a contrast higher than in the case where the blue or transparent alignment mark is used can be obtained.

The present invention further provides a color filter manufacturing method for forming a blue filter from a blue color resist by a photolithographic technique by using an exposure apparatus having an alignment optical system of a red light, comprising the steps of:

forming a red filter and a red alignment mark from a color resist having a color identical to a red color of the light of the alignment optical system before forming the blue filter; and forming the blue filter from the blue color resist by performing alignment of a photomask for exposure with the red alignment mark by the alignment optical system.

According to the above invention, when forming a blue color filter from the blue color resist having the lowest transmittance of the red light from the alignment optical system, the red alignment mark having the highest transmittance is to be used, so that a contrast higher than in the case where the blue or transparent alignment mark is used can be obtained.

In an embodiment of the invention, there is provided a color filter manufacturing method, further comprising the step of forming, prior to the formation of the red alignment mark from the red color resist, an underlay under a region in which the red alignment mark is formed, wherein the underlay exhibits a reflectance of not smaller than a specified value and has a size for covering at least the region.

According to the above embodiment, the underlay of the high reflectance is formed in the size for covering at least the region in which the alignment mark is formed is formed under the red alignment mark. Therefore, the red light emitted from the alignment optical system is efficiently made incident on the alignment optical system with a small loss and used for detecting the alignment mark.

In an embodiment of the invention, there is provided a color filter manufacturing method, further comprising the step of forming an anti-reflection layer on the blue color resist for forming the blue filter, said anti-reflection layer exhibiting a refractive index of not greater than a specified value.

According to the above embodiment, the anti-reflection layer having a low refractive index is formed on the blue color resist, and therefore, the light reflected on the surface of the blue color resist is weakened. Thus, the reflected light from the surface that becomes a noise for the light to be incident on the alignment optical system from the red alignment mark is weakened, so that the contrast of the alignment mark is further enhanced.

The present invention also provides an alignment mark used in performing alignment of a photomask for exposure by an alignment optical system of an exposure apparatus, wherein:

the alignment mark has a color identical to a color of light of the alignment optical system.

According to the above invention, when forming a primary color filter of a color different from the color of the light of the alignment optical system, the alignment of the photomask is performed with the alignment mark of the color identical to the color of the light of the alignment optical system. Therefore, when forming a blue primary color filter having the lowest transmittance of red light, for example, in the case where the light of the alignment optical system is red, a contrast higher than in the case where the blue or any other transparent color alignment mark is used can be obtained by using the red alignment mark having the highest transmittance.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
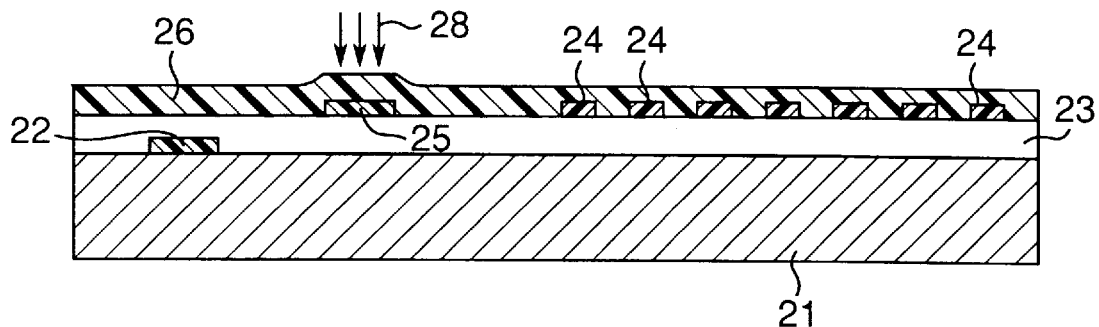
FIGS. 1A and 1B are views showing a process of forming a blue filter according to a color filter manufacturing method of the present invention.
Figure 1B:
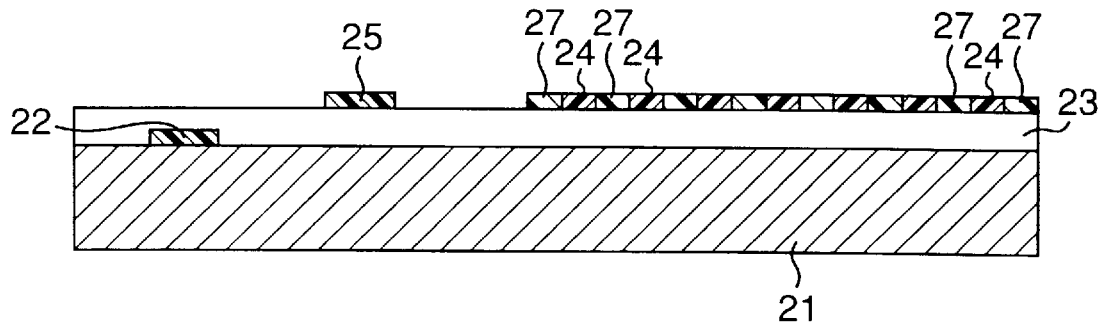

The present invention will be described in detail below on the basis of embodiments thereof with reference to the accompanying drawings. FIGS. 1A and 1B show a process of forming a blue filter according to a first embodiment of the present invention.

As shown in FIG. 1A, a light-shielding layer or the like for determining light-sensing aperture is patterned on a groundwork device substrate 21, thereby forming a groundwork alignment mark 22. Then, in order to facilitate formation of a color filter by flattening vertical unevenness of a groundwork device, the entire groundwork device substrate 21 is covered with a transparent acrylic resin, thereby forming an overcoat film 23. Subsequently, a color filter forming process is started.

In the color filter forming process, a red filter 24 is formed prior to formation of a blue color filter 27. This red filter 24 is formed by applying a red resist (not shown) onto the overcoat film 23, performing alignment of a red filter use photomask (not shown) by the groundwork alignment mark 22 and thereafter performing processes of exposure to light, development and post-baking with regard to the red resist.

In the present embodiment, a red alignment mark 25 to be used when forming at least the blue filter 27 is simultaneously formed together with the red filter 24 in the same process. This red alignment mark 25 has such a shape as used for a normal alignment. In this case, it is preferable to form the red alignment mark 25 from a color resist layer excellent in mask linearity in terms of the finish accuracy of the alignment mark. However, the red alignment mark may be formed by the aforementioned dying method if it is possible to preparatorily consider the large dimensional shift caused by the swelling due to dying as well as the accompanying smudging, color mixture and so on.

The red filter 24 and the red alignment mark 25 are thus formed, then the blue filter 27 is formed, as shown in FIG. 1B, continuously or after forming an intermediate layer (green filter, for example). More specifically, the formation of this blue filter 27 is performed by applying a blue resist 26 to the entire surface of the overcoat film 23, performing alignment of a blue filter use photomask (not shown) by applying a red alignment light 28 to the red alignment mark 25 formed simultaneously with the red filter 24, thereafter performing processes of exposure, development and post-baking, and thereby transferring a filter pattern of the photomask onto the blue resist 26.

In this case, in normal forming the film of the blue resist 26, the blue resist 26 is formed to a film thickness of about 1.0 $\mu$m. Then, assuming that a He—Ne laser light (red light) is used as a light source in performing alignment of an exposure photomask (not shown) for the blue filter, that a ratio $d_1/d_0$ of a film thickness $d_1$ (see FIG. 2) of the blue resist 26 just above the red alignment mark 25 to a film thickness do of the blue resist 26 in the flat portion other than the blue resist portion located on the red alignment mark 25 is $d_1/d_0=\frac{1}{2}$ and that the transmittance of the blue resist 26 having a film thickness of 1.0 $\mu$m is 15%, then a ratio $I_1/I_0$ of a transmission light intensity $I_1$ of the red alignment mark 25 to the transmission light intensity $I_0$ of the flat portion becomes $I_1/I_0 \approx 2.6$.

Figure 2:
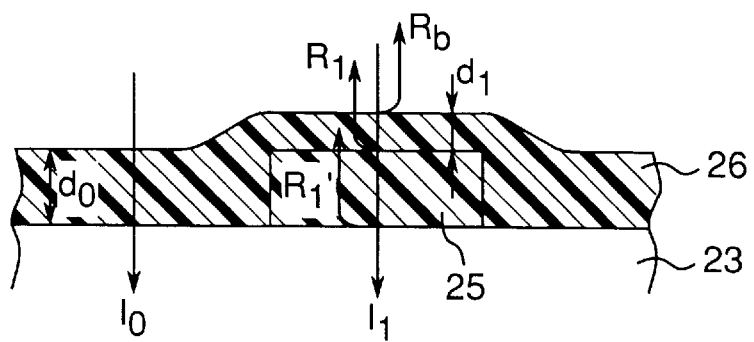
FIG. 2 is an explanatory view of reflection lights concerning a red alignment mark in FIG. 1A.

In the case where a color resist having a high performance in filling cavities is used as the blue resist 26, the film thickness $d_1$ of the blue resist 26 just above the red alignment mark 25 becomes relatively small. Therefore, in such a case, the value of transmission light quantity ratio $I_1/I_0$ can be increased, and this is regarded as satisfactory in terms of signal detection of the exposure apparatus. However, light transmitted through the blue color resist 26 in the flat portion and light transmitted through the blue color resist 26 just above the red alignment mark 25 are reflected on the surface (generally having a low reflectance) of the groundwork device and again made incident on a detection system of the exposure apparatus through the blue resist 26. Therefore, transmission light intensities $I_{R1}$ and $I_{R0}$ incident on the detection system become faint signals. Therefore, actually, as shown in FIG. 2, a reflection light R1 at the boundary between the blue resist 26 and the red alignment mark 25 and a reflection light R1' at the boundary between the red alignment mark 25 and the overcoat film 23 are greatly concerned in the contrast of the red alignment mark 25.

Figure 7A:
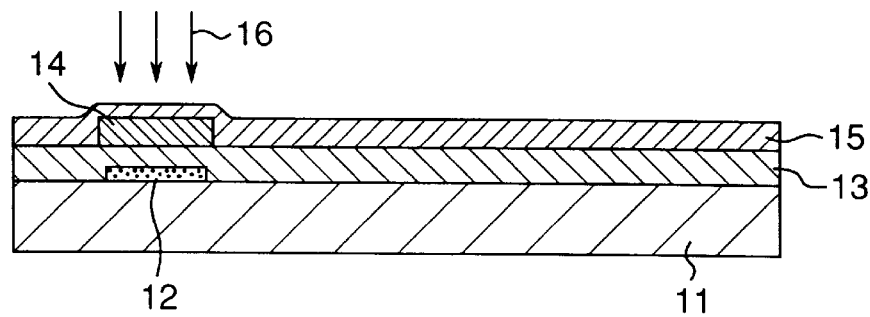
FIGS. 7A and 7B are views showing a process of forming a blue filter by means of a groundwork alignment mark according to a prior art color filter manufacturing method different from FIGS. 6A and 6B.

The contrast in the case where the alignment of the photomask (not shown) for exposure is performed with the red alignment mark 25 by a red alignment light as in the present embodiment is now compared with the contrast in the case where the alignment is performed with the groundwork alignment mark 12 via the transparent layer 14 as shown in FIG. 7A.

Figure 3B:
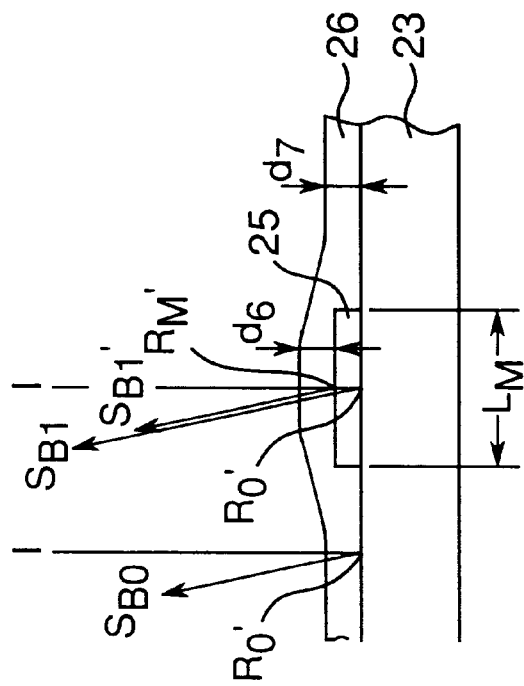
FIGS. 3A and 3B show a comparison between reflection lights concerning the prior art groundwork alignment mark and reflection lights concerning the red alignment mark in FIG. 1A.
Figure 3A:
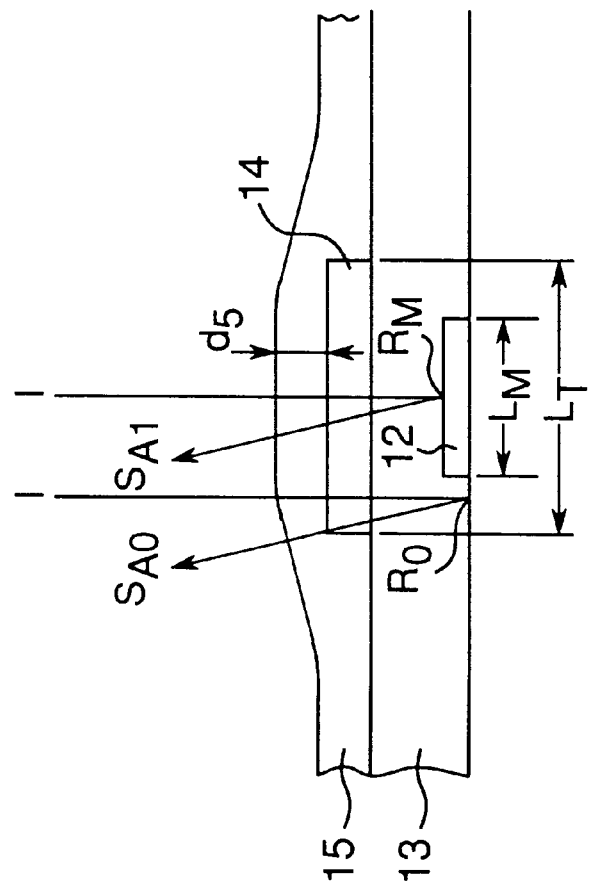

Referring to FIGS. 3A and 3B, it is assumed that the color resist layer 15 on the transparent layer 14 has a film thickness $d_5$, that the groundwork alignment mark 12 has a reflectance $R_M$ and that the groundwork device substrate has a reflectance $R_0$. It is further assumed that a flat portion of the color resist layer 26 on the red alignment mark 25 has a film thickness $d_6$, that the other flat portion of the color resist 26 has a film thickness $d_7$, that the red alignment mark 25 has a reflectance $R_M'$ and that a reflectance of an interface between the red alignment mark 25 and the overcoat film 23 is $R_0'$.

A contrast $C_A$ in the case where the alignment of the photomask for exposure is performed with the groundwork alignment mark 12 via the color resist layer 15 and the transparent layer 14 is $C_A = |S_{A0-SA1}| \approx Ie^{-2\alpha d5}|R_0 - R_M|$. On the other hand, a contrast $C_B$ of the present embodiment becomes $C_B = |S_{B0} - (S_{B1} + S_{B1}')| \approx Ie^{-2\alpha d6}|(e^{-2\alpha(d7-d6)} - 1)R_0' - R_{M'}|$. In this case, assuming that $d_7 >> d_6$, So $e^{-2\alpha(d7-d6)} \approx 0$, then $C_B \approx Ie^{-2\alpha d6}|R_0' + R_{M'}|$. Therefore, their contrast ratio $C_A/C_B$ is $C_A/C_B \approx |(R_0 - R_M)/(R_0' + R_{M'})| \cdot e^{-2\alpha(d5-d6)}$.

Figure 7B:
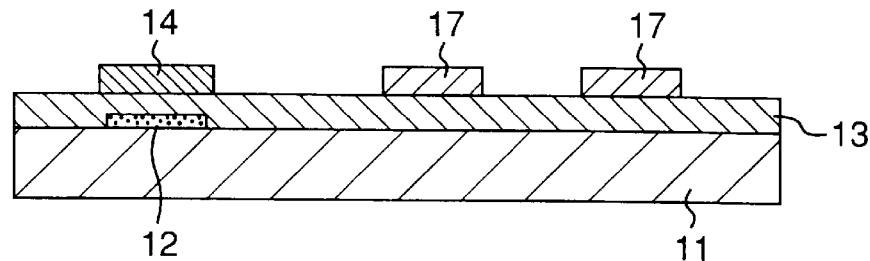

Normally, the thickness of the color resist layer 15 on the transparent layer 14 increases as the length along the flattening layer 13 of the transparent layer 14 formed on the flattening layer 13 increases. Similarly, the thickness of the color resist layer 26 on the alignment mark 25 increases as the length along the flattening layer 23 of the alignment mark 25 formed on the flattening layer 23 increases. Therefore, assuming that the length $L_T$ of the transparent layer 14 and the length $L_M$ of the alignment mark 12 (=the length of the alignment mark 25) have a relationship of $L_T >> L_M$ so as to generate no false signal of the mark signal of the exposure apparatus, then $d_5 > d_6$. Therefore, the term "$e^{-2\alpha(d5-d6)}$" of the expression of $C_A/C_B$ becomes $e^{-2\alpha(d5-d6)} < 1$. Further, as described above, the reflectance $R_M$ of the groundwork alignment mark 12 made of a transparent resin is approximately equal to the reflectance $R_0$ of the groundwork device substrate made of silicon or silicon oxide, and the term "$R_0 - R_M$" of the expression of the contrast ratio $C_A/C_B$ becomes $(R_0 - R_M) \approx 0$. As a result, $C_A/C_B$ becomes $C_A/C_B < 1$. For the above reasons, the contrast $C_B$ of the present embodiment comes to have a value higher than that of the contrast $C_A$ in the case where the groundwork alignment mark is used as shown in FIG. 7.

As described above, in the present embodiment, the groundwork alignment mark 22 is formed by patterning the light-shielding layer or the like on the groundwork device substrate 21 and thereafter the overcoat film 23 is formed of a transparent acrylic resin. Then, the alignment of the photomask is performed by means of the groundwork alignment mark 22 after applying the red resist to the overcoat film 23, and the red filter 24 and the red alignment mark 25 for forming the blue filter 27 are simultaneously formed by the photolithographic technique. Further, the alignment of the photomask is performed by means of the red alignment mark 25 after applying the blue resist 26 when forming the blue filter 27, thereby forming the blue filter 27 by the photolithographic technique. Thus, by using the red alignment mark 25 that does not absorb the red alignment light as a target for the alignment of the photomask when forming the blue filter 27, the transmission light intensity $I_1$ of the red alignment mark 25 is increased more than in the case where the groundwork alignment mark 22 is used. Further, the reflection light $(R_1 + R_1')$ concerning the red alignment mark 25 is increased more than in the case where the groundwork alignment mark 22 is used. Therefore, according to the present embodiment, the contrast of the alignment mark when forming the blue filter 27 is more sufficiently enhanced than in the case where the groundwork alignment mark 22 is used.

Further, the alignment mark 25 to be used when forming the blue filter 27 is formed just below the blue resist 26 that serves as the layer to be aligned and on a surface on which the blue filter is to be formed. Therefore, a top surface of the blue resist 26 and a top surface of the red alignment mark 25 are put close to each other, and an alignment error attributed to refraction or ghost hardly occurs even when the laser light is used as an alignment light.

Furthermore, in the present embodiment, the transparent layer that may cause generation of a false signal of the mark signal of the exposure apparatus is not formed above the groundwork alignment mark 22 and the red alignment mark 25 in contrast to the case of the color filter manufacturing method disclosed in the prior art reference of Japanese Patent Laid-Open Publication No. HEI 9-96712. Therefore, the generation of the false signal is eliminated to allow the alignment accuracy to be improved.

Furthermore, the red alignment mark 25 that is the feature of the present embodiment is formed simultaneously with formation of the red filter 24 by the same method as that for forming the red filter 24. Accordingly, there is no need for modifying the prior art color filter manufacturing method that uses the groundwork alignment mark as the target in performing the alignment of the photomask. Therefore, the cost increase from the prior art color filter manufacturing method is suppressed to allow a high throughput to be assured in the color filter forming process.

That is, in the present embodiment, a high alignment accuracy is obtained. Therefore, as shown in FIGS. 1A and 1B, no overlap occurs between the color filters 24 and 27 even when the blue filters 27, 27, . . . are formed between the red filters 24, 24, . . . , so that a color filter pattern in which the boundary between the color filters 24 and 27 is clear can be obtained.

Figure 4A:
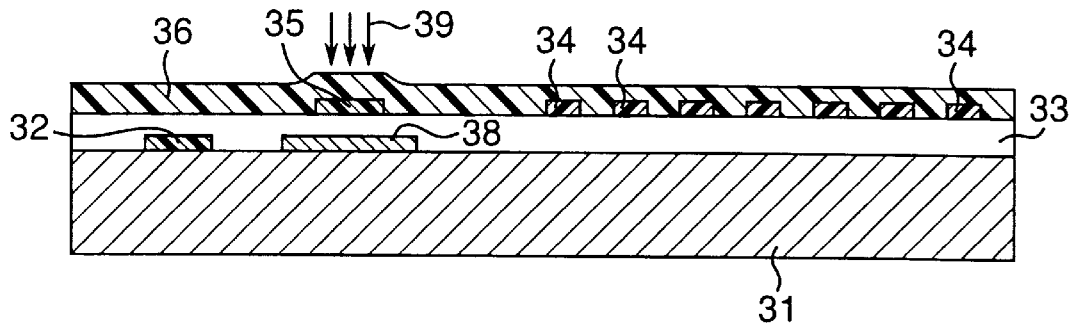
FIGS. 4A and 4B are views showing a process of forming a blue filter different from FIGS. 1A and 1B.
Figure 4B:
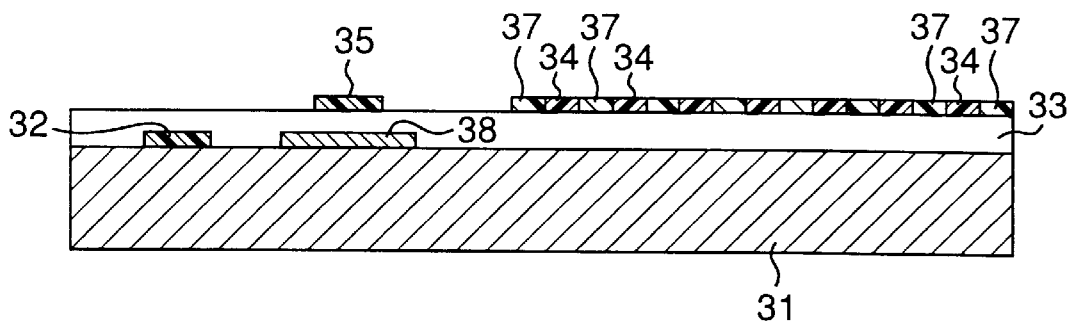

FIGS. 4A and 4B show a process of forming a blue filter according to the second embodiment. In the first embodiment, as described above, the light that has penetrated the red alignment mark 25 is reflected on the groundwork device surface having a low reflectance, and therefore, the light incident on the detection system of the exposure apparatus becomes faint. In contrast, in the present second embodiment, the alignment light is effectively utilized by increasing the reflection light intensity of the light that has penetrated the red alignment mark, thereby improving the accuracy of the alignment of the photomask.

When forming light-receiving aperture (not shown) and a pattern of a groundwork alignment mark 32 by a high-reflection material (for example, Al (aluminum) having a surface reflectance of about 90%) of the light-shielding film or the like in the process of forming the groundwork device, there is formed a mark underlay 38 of a high-reflection material having a size sufficient for covering the entire area of a red alignment mark 35 on a groundwork device substrate 31 and directly below the portion in which the red alignment mark 35 is formed. Subsequently, similar to the first embodiment, an overcoat film 33, a red filter 34, the red alignment mark (blue filter forming use alignment mark) 35, a blue resist 36 and a blue filter 37 are successively formed.

As described above, in the present embodiment, the mark underlay 38 of the high-reflection material is formed on the groundwork device substrate 31 and just below the portion in which the red alignment mark 35 is formed. Therefore, the transmitted light in the case where an alignment light 39 is applied to the red alignment mark 35 is reflected on the mark underlay 38 having a surface reflectance of about 90% formed just below the red alignment mark. Consequently, a reflection light intensity much higher than that in the first embodiment where the transmitted light of the red alignment mark 25 is merely reflected on the groundwork device substrate 31 is obtained, so that the red light from the alignment optical system can be efficiently utilized for the detection of the mark of the exposure apparatus without causing a loss to the red light from the alignment optical system. Therefore, the alignment accuracy when forming the blue filter by means of the alignment optical system of the red light is remarkably improved.

Figure 5:
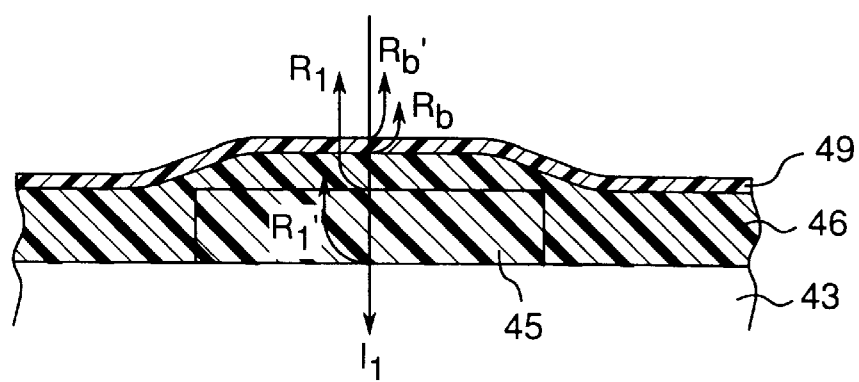
FIG. 5 is a sectional view of a portion in the vicinity of a red alignment mark different from FIG. 1A and FIG. 4A.
Figure 6A:
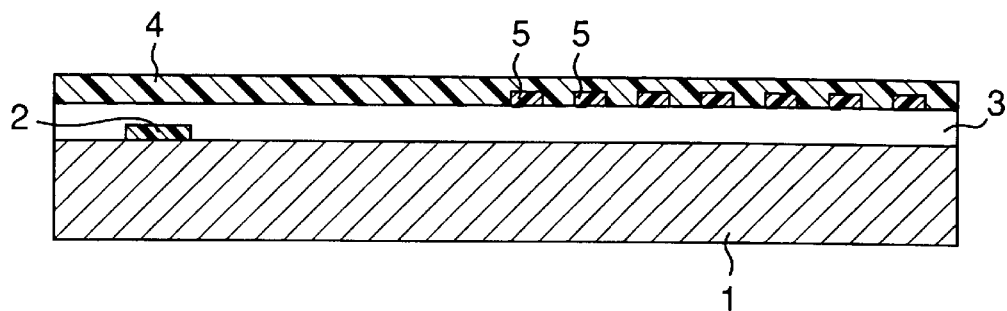
FIGS. 6A and 6B are views showing a process of forming a blue filter by means of a groundwork alignment mark according to a prior art color filter manufacturing method.
Figure 6B:
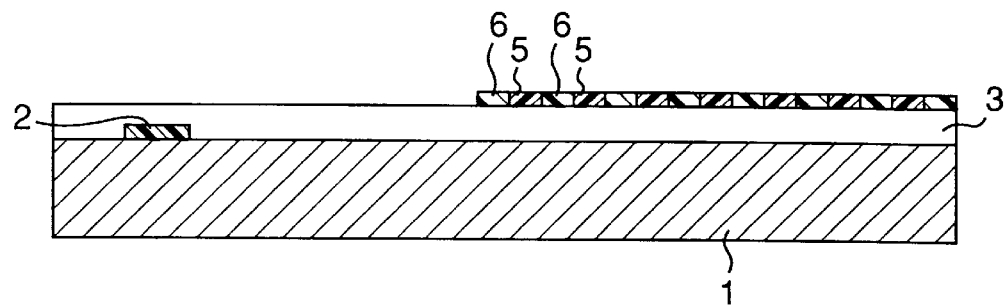

FIG. 5 shows a cross section in the vicinity of a red alignment mark according to the third embodiment. In order to increase reflection light $R_1$ at the boundary between a blue resist 46 and a red alignment mark 45 and reflection lights $R_1'$ at the boundary between an overcoat film 43 and the red alignment mark 45, which are much concerned in the contrast of a red alignment mark 45, the existence of a reflection light $R_b$ on the surface of the blue resist 46 cannot be ignored. The reflection light $R_b$ operates as the so-called noise component (offset) having no advantageous information for the mark signal in the exposure apparatus. Therefore, in the present embodiment, an anti-reflection layer 49 (for example, an anti-reflection material AZ AQUA-TAR produced by Clariant Japan Corp.) having a low refractive index (for example, refractive index n=1.4) is formed by spin coating on the blue resist 46. Then, a light $R_b'$ having a phase opposite to that of the reflection light $R_b$ is reflected on the surface of the anti-reflection layer 49, thereby canceling the reflection light $R_b$. It is proper to determine the refractive index and the coating film thickness of the anti-reflection layer 49 by taking into consideration the wavelength of the incident light and the phase relation between the reflection light $R_b'$ on the surface of the anti-reflection layer 49 and the reflection light $R_b$ on the surface of the blue resist 46.

The aforementioned embodiments are each described on an example in which the red light of the He—Ne laser or the like is used as the alignment probing light during the alignment of the photomask so as to form the blue color filter having the lowest transmittance to the red light among the three colors of RGB (red, green and blue). However, the present invention is not limited to this. What is essential is to select the color resist of the specified color having the lowest transmittance of the alignment light among the color resists for forming the primary color filters and form the alignment mark that is used for the specified color and has a color different from that of the selected color resist (preferably the color having the highest transmittance).

The invention being thus described, it will be obvious that the same may be varied in many ways. Such variations are not be regarded as a departure from the sprit and scope of the invention, and all such modifications as would be obvious to one skilled in the art are intended to be included within the scope of the following claims.

What is claimed is:

1. A color filter manufacturing method for forming a plurality of types of color filters from color resists by a photolithographic technique using a photomask and an associated optical system that transmits light onto the color resists, comprising the steps of:

selecting a color resist of a specified color having a lowest transmittance with respect to the light for alignment from among the color resists, and forming an alignment mark of a color different from the specified color of the selected color resist;

forming a layer of said selected color resist that generally has a thickness $d_0$, but has a thickness $d_1$ in a region where said selected color resist layer overlies said alignment mark of a color different from the specified color of the selected color resist, where $d_1 < d_0$; and aligning the photomask to form a color filter from said layer of said selected color resist in response to a comparison of the intensity $I_0$ of light transmitted through said color resist layer $d_0$ to the intensity $I_1$ transmitted through said color resist layer $d_1$ and said alignment mark.

2. A color filter manufacturing method for forming a plurality of types of color filters from color resists by a photolithographic technique using a photomask and an associated optical system that transmits light onto the color resists, comprising the steps of:

forming an alignment mark of a color identical to a color of light of an alignment optical system; and forming a color filter from a color resist by performing alignment of a photomask for exposure with the alignment mark, said color filter forming including forming a layer of said selected color resist that generally has a thickness $d_0$, but has a thickness $d_1$ in a region where said selected color resist layer overlies said alignment mark of a color different from the specified color of the selected color resist, where $d_1 < d_0$; and aligning the photomask to form a color filter from said layer of said selected color resist in response to a comparison of the intensity $I_0$ of light transmitted through said color resist layer do to the intensity $I_1$ transmitted through said color resist layer $d_1$ and said alignment mark.

3. A color filter manufacturing method for forming a blue filter from a blue color resist by a photolithographic technique by using an exposure apparatus having a photomask and an associated alignment optical system of a red light, comprising the steps of:

forming a red filter and a red alignment mark from a color resist having a color identical to a red color of the light of the alignment optical system before forming the flue filter; and forming the blue filter from the blue color resist by performing alignment of a photomask for exposure with the red alignment mark by the alignment optical system, said blue filter forming including forming a layer of said selected color resist that generally has a thickness $d_0$, but has a thickness $d_1$ in a region where said selected color resist layer overlies said alignment mark of a color different from the specified color of the selected color resist, where $d_1 < d_0$; and aligning the photomask to form a color filter from said layer of said selected color resist in response to a comparison of the intensity $I_0$ of light transmitted through said color resist layer do to the intensity $I_1$ transmitted through said color resist layer $d_1$ and said alignment mark.

4. A color filter manufacturing method as claimed in claim 3, further comprising the step of forming, prior to the formation of the red alignment mark from the red color resist, an underlay under a region in which the red alignment mark is formed, wherein the underlay exhibits a reflectance of not smaller than a specified value and has a size for covering at least the region.

5. A color filter manufacturing method as claimed in claim 3, further comprising the step of forming a reflection preventing layer on the blue color resist for forming the blue filter, said reflection preventing layer exhibiting a refractive index of not greater than a specified value.

6. An alignment mark used in performing alignment of a photomask for exposure in forming a color filter by an alignment optical system of an exposure apparatus, wherein:

the alignment mark has a color identical to a color of light of the alignment optical system and an associated high transmittance of the light, and said color filter forming includes forming a layer of said selected color resist that generally has a thickness $d_0$, but has a thickness $d_1$ in a region where said selected color resist layer overlies said alignment mark of a color different from the specified color of the selected color resist, where $d_1 < d_0$; and aligning the photomask to form a color filter from said layer of said selected color resist in response to a comparison of the intensity $I_0$ of light transmitted through said color resist layer do to the intensity $I_1$ transmitted through said color resist layer $d_1$ and said alignment mark.

\* \* \* \* \*